June 1, 1926.

A. McDOWELL 1,586,908

BARREL LOADER

Filed Jan. 24, 1925     3 Sheets-Sheet 1

A. McDowell, Inventor

By Richard B. Owen,

Attorney

June 1, 1926. 1,586,908
A. McDOWELL
BARREL LOADER
Filed Jan. 24, 1925 3 Sheets-Sheet 2
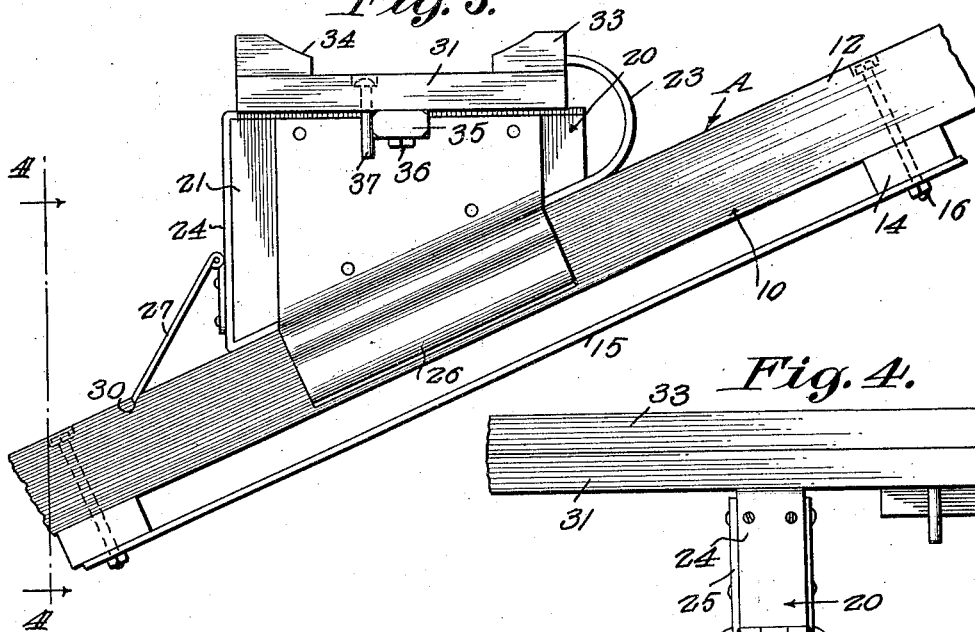
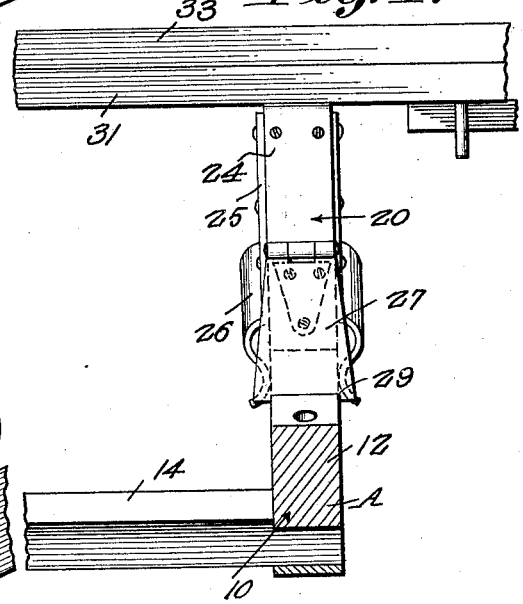
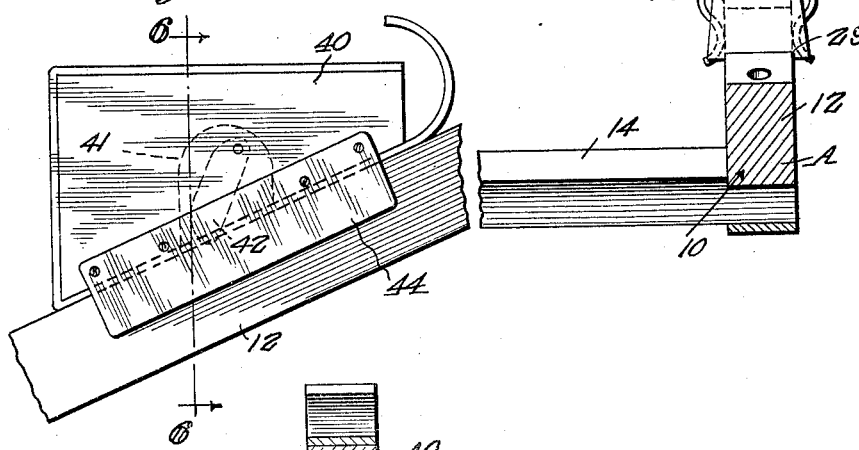
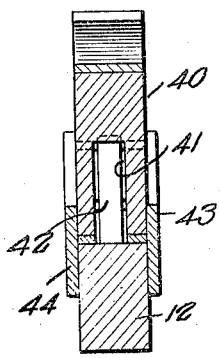
A. McDowell, Inventor June 1, 1926.

A. McDOWELL

BARREL LOADER

Filed Jan. 24, 1925

1,586,908

3 Sheets-Sheet 3

A. McDowell, Inventor

By Richard B. Owen

Attorney

Patented June 1, 1926.                                    1,586,908

UNITED STATES PATENT OFFICE.

ALBERT McDOWELL, OF LOS ANGELES, CALIFORNIA.

BARREL LOADER.

Application filed January 24, 1925. Serial No. 4,492.

This invention relates to loading and hoisting devices and the primary object of the present invention is to provide a novel means for loading and unloading heavy objects, such as barrels and the like from elevated platforms, wagons and et cetera with a minimum amount of difficulty and energy on the part of the operator of the device.

Another object of the invention is to provide a novel loading and unloading device for trucks and the like embodying a novelly constructed inclined skid and a carriage for supporting the load to be raised or lowered and novel means for permitting the carriage to be raised or lowered in a step by step movement.

Another object of the invention is the provision of a loading and unloading device for trucks embodying an inclined skid and a novel carriage slidably mounted upon the skid for receiving the objects being handled.

Another object of the invention is to provide novel means for locking the carriage on the skid for preventing the too rapid descent thereof, when a load is placed thereon.

A further object of the invention is the provision of novel guides carried by the carriage for engaging the opposite faces of the side rails of the skid, said guides serving as means for frictionally engaging the skid for preventing the slipping of the carriage.

A further object of the invention is to provide an improved loading and unloading device of the above character, which will be durable and efficient in use, one that will be simple and easy to manufacture and one which can be placed upon the market at a small cost.

With these and other objects in view, the invention consists in the novel construction, arrangement and formation of parts, as will be hereinafter more specifically described, claimed and illustrated in the accompanying drawings, in which drawings:—

Figure 1:
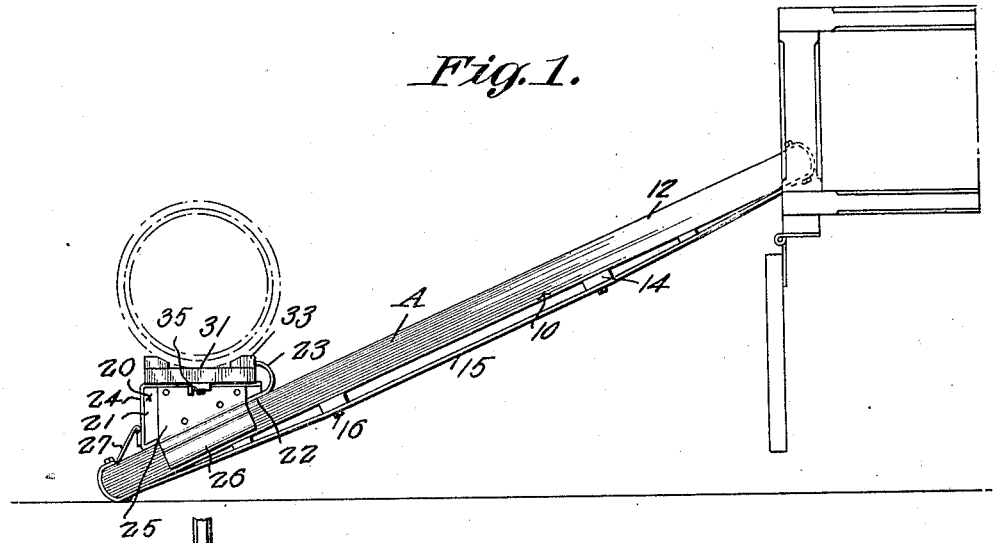
Figure 2:
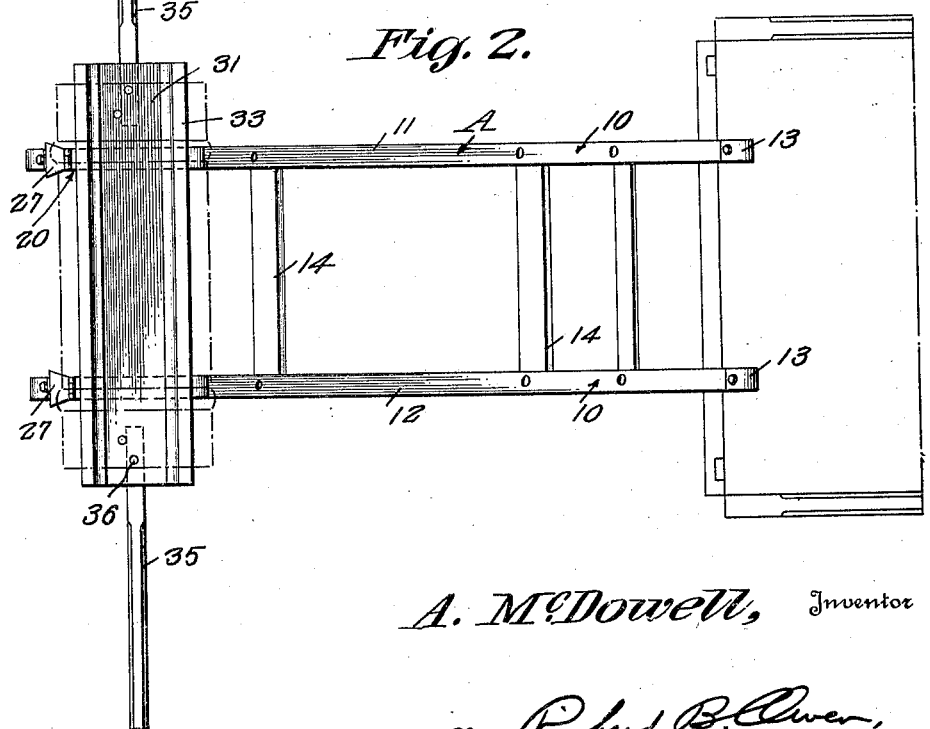
Figure 7:
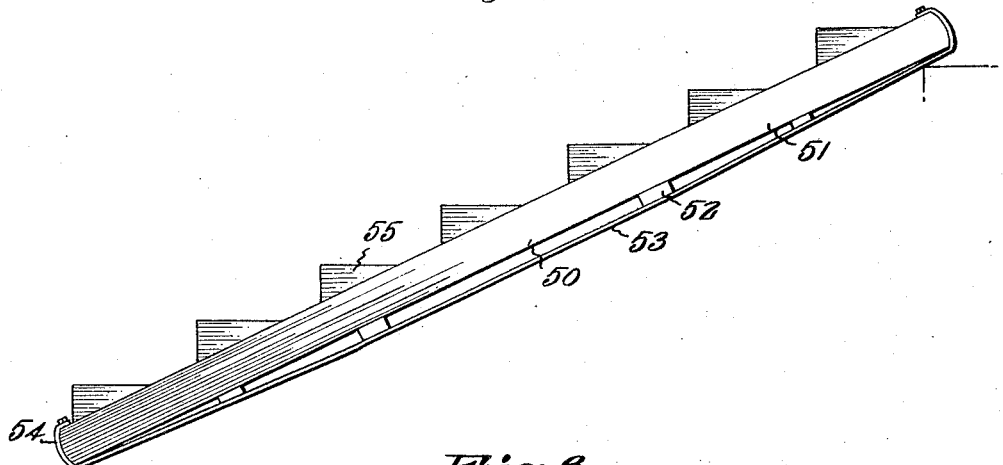
Figure 8:
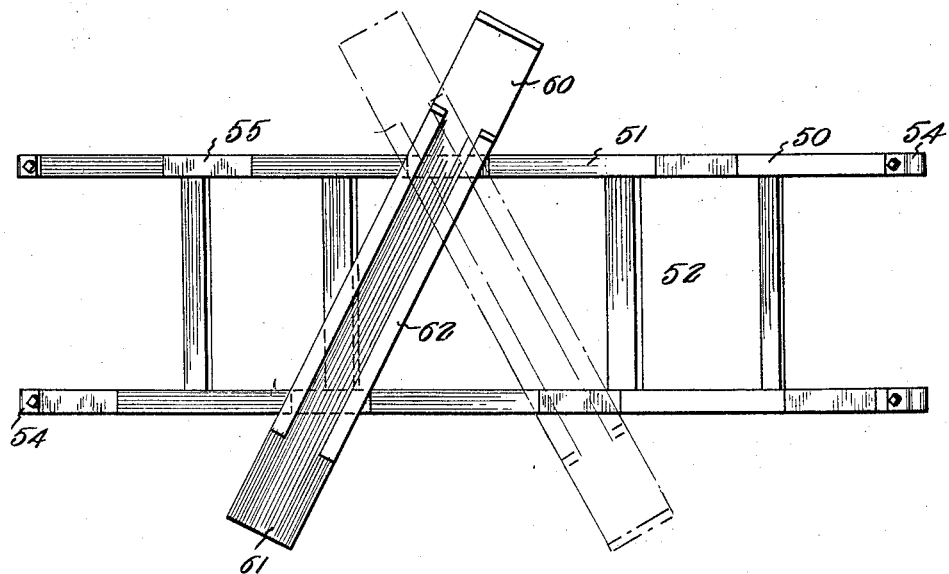

Figure 1 is a side elevation of the improved device showing the same being used for loading barrels into a truck, Figure 2 is a top plan view of the same, Figure 3 is an enlarged fragmentary side elevation of the improved device, Figure 4 is a detail section through the device taken on the line 4—4 of Figure 3 of the drawing, Figure 5 is an enlarged detail fragmentary side elevation showing a slightly modified form of carriage, Figure 6 is a detail section through the modified form of the device taken on the line 6—6 of Figure 5, Figure 7 is a side elevation of a still further modified form of the skid, and Figure 8 is a top plan view of the modified form of skid shown in Figure 7 with the carriage for supporting the load to be raised or lowered arranged thereon.

Referring to the drawings in detail, wherein similar reference characters designate corresponding parts throughout the several views the letter A generally indicates the improved loading and unloading device, which comprises a novel skid 10, and a novel carriage 20 slidably mounted thereon.

The novel skid 10 includes spaced longitudinally extending side rails 11 and 12 which are preferably formed from relatively heavy timber. The terminals of the rails can be provided with wear irons 13 and any suitable means can be provided for firmly connecting the skid with a truck, loading platform or the like.

The skid 10 can be braced in any desired way and as shown the rails 11 and 12 are connected at spaced points, by transverse cross bars 14. Longitudinally extending reinforcing strap irons 15 can be provided for further bracing the skid and as shown these straps are bolted as at 16 to the cross pieces 14. It is to be also noted that the cross pieces 14 adjacent to the terminals of the skid are of a less thickness than the cross pieces arranged adjacent to the central portion of the skid. The reinforcing strap irons 15 can be formed integral with the wear irons 13 if so desired.

The improved carriage 20 comprises side blocks 21 of a substantial triangular configuration in side elevation and these blocks have their lower inclined faces arranged in sliding contact with the upper faces of the rails 11 and 12. The upper faces of the blocks are disposed substantially in a horizontal plane and form a seat for the articles being loaded. The blocks 21 have their lower surface provided with wear irons or runners 22, the forward terminals of which are provided with arcuate extensions providing horns 23 which are disposed in front of and over the said blocks. The rear ends of the wear irons 22 are bent upwardly into engagement with the rear faces of the blocks as at 24 and are continued and bent into engagement with the upper faces of the blocks.

The opposite side faces of the blocks have riveted or otherwise secured thereto side plates 25 and the lower terminals of the plates are provided with depending and angularly extending resilient clamping jaws 26 which are adapted to frictionally engage the opposite side faces of the rails 11 and 12. The resilient clamping jaws 26 form guides for the carriage and also serve as means for gripping the rails so as to prevent the too rapid descent of the carriage under load.

In order to further prevent the too rapid descent of the carriage, when under load and to hold the carriage in a partially raised position on the skid 10 pivoted biting dogs 27 are secured to the rear end of each block. The lower terminals of these pivoted biting dogs are flared outwardly as at 28 and are provided with a lower biting edge 30 for engaging the upper faces of the rail. The biting dogs are of such a length as to normally extend below the carriage and are adapted to be forced into biting contact with the rails, when the carriage has a tendency to slip downward on the skid.

In loading or unloading boxes or other articles having a flat lower face, the same are placed directly upon the upper edges of the blocks 21 against the forward terminals of the horns 23. The carriage can now be readily slid up the skid by the efforts of a single person without any undue effort.

When cylindrical objects, such as barrels and the like are being handled the bed or dolly block 31 can be placed upon the upper faces of the blocks 21 and the upper face of the bed or dolly block can be provided with front and rear cleats or chock blocks 33. The upper faces of the cleats or blocks 33 are provided with arcuate faces 34 to form a seat for the cylindrical object being handled. The forward cleat is adapted to be engaged by the horns 23 of the carriage. After a barrel is placed upon the cleats or blocks 33 the carriage can be readily slid up the skid.

In some instances when a relatively great load is being raised or lowered the bed or dolly block 31 can be provided with laterally extending handles 35 and persons can then stand on each side of the carriage and push against the handles. These handles may be arranged in any desired way, but as shown the inner ends thereof are pivoted as at 36 to the lower faces of the bed or dolly block 31 and are adapted to engage stop pins 37 disposed in the path of the inner ends thereof. These stop pins 37 limit the swinging movement of the handles in one direction, but permit the handles to be folded or swung in the opposite direction so that the bed or dolly block will occupy a minimum amount of space when not in use.

In Figures 5 and 6 a slightly modified form of carriage is shown which will now be described. The carriage in this form also includes side blocks 40 which have their lower faces provided with pockets 41 in which are pivotally mounted cams or dogs 42, the lower ends of which are adapted to extend through slots 43 formed in the wear irons carried by the lower faces of the blocks. These dogs or cams 42 are so mounted as to frictionally engage the carriage when the same tends to slip down the skid. As shown the side faces of the blocks are provided with depending rigid plates 44 which serve as guides and which are adapted to engage the opposite side faces of the rails.

Any preferred means can be used for placing the articles to be lifted on the carriage, such as by choking the article up by means of wedges and the like, which is to be raised.

In Figures 7 and 8 I have shown another form of my invention which embodies a novel form of skid 50 and a novel carriage 60 on which the article to be raised or lowered is adapted to be placed.

The skid 50 embodies a frame, which can be constructed substantially the same as the skid shown in Figures 1 and 2 inclusive and, as shown this skid embodies the longitudinally extending side rails 51 formed of relatively heavy timber which are connected by transversely extending cross braces 52. The frame can be braced in any desired manner such as by longitudinally extending iron straps 53 which can be secured to the lower faces of the cross braces 52 and the terminals thereof. These iron straps 53 are arranged directly under side rails 51 and have their terminals bent around the ends of the rails as at 54 to provide wear irons for protecting the said rails. The upper faces of the rails 51 are provided with spaced blocks or steps 55 as clearly shown in Figures 7 and 8. The blocks or steps 55 are arranged in staggered relation relative to one another, for a purpose, which will be hereinafter more fully described.

The carriage 60 in this form of the invention consists of a flat board 61 which is adapted to extend transversely of the skid 50 and the longitudinal edges of the board at the upper face thereof is provided with cleats 62 for engaging the load being raised to prevent slipping thereof. Thus if a cylindrical object, such as a barrel is being raised or lowered, the same is placed on the board 61 between the cleats 62 which will effectively prevent the rolling thereof.

In this form of the invention, the barrel or other object to be raised is placed upon the carriage 60 and one end of the board is then lifted and placed upon the first block or step 55 of the skid, after which the barrel slides toward the opposite end of the board. The opposite end of the board or carriage is then raised and the same is swung and placed on the opposite step or block and the barrel slides toward the other end of the carriage. This operation is repeated until the load has been raised.

From the foregoing description, it can be seen that I have provided a novel loading and unloading device, which will permit the convenient and expeditious handling of heavy objects.

Changes as to details may be made without departing from the spirit or the scope of this invention, but:—

What I claim as new is:—

1. In a loading and unloading device, a skid including a pair of spaced longitudinally extending side rails, blocks secured to the upper faces of the rails, the blocks being arranged in staggered relation relative to one another, and a flat transversely extending carriage for receiving the load to be raised or lowered for engaging first one step and then the other.

2. A barrel loader comprising an inclined skid including a pair of spaced longitudinally extending side rails, means connecting the rails together, blocks secured to the upper faces of the rails arranged in staggered relation relative to one another, an inclined board arranged to extend across the skid for engaging first one block and then the other, and cleats carried by the upper face of the board adjacent to the longitudinal edges thereof, the board being adapted to receive articles to be lifted and of sufficient length to permit the articles to slide from one end thereof to the other.

In testimony whereof I affix my signature.

ALBERT McDOWELL.